US007640717B2

(12) United States Patent  
Shokri et al.

(10) Patent No.: US 7,640,717 B2
(45) Date of Patent: Jan. 5, 2010

(54) COUNTER ELEMENT AND METHOD OF PRODUCING THE SAME

(75) Inventors: Ebi Shokri, Vallentuna (SE); Roland Palmquist, Åkarp (SE); Reinhard Kupfer, Mainz (DE); Renato Cetrelli, Lund (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 11/578,956

(22) PCT Filed: Mar. 22, 2005

(86) PCT No.: PCT/SE2005/000410

§ 371 (c)(1),
(2), (4) Date: Oct. 19, 2006

(87) PCT Pub. No.: WO2005/105579

PCT Pub. Date: Nov. 10, 2005

(65) Prior Publication Data

US 2007/0251196 A1    Nov. 1, 2007

(30) Foreign Application Priority Data

Apr. 29, 2004    (SE) .................................... 0401101

(51) Int. Cl.
*B65B 9/12* (2006.01)
*B30B 15/34* (2006.01)
(52) U.S. Cl. ............................. 53/552; 53/451; 53/545; 156/583.3

(58) Field of Classification Search .................... 53/450, 53/451, 452, 547, 548, 550, 551, 552; 156/583.3, 156/583.91
See application file for complete search history.

(56) References Cited

U.S. PATENT DOCUMENTS 3,679,509 A * 7/1972 Fielibert ...................... 156/182
3,849,965 A * 11/1974 Dominici ...................... 53/451

(Continued)

FOREIGN PATENT DOCUMENTS

EP    0 730 946 A2    9/1996

(Continued)

OTHER PUBLICATIONS

English translation of Japanese Office Action dated Jul. 7, 2009 in corresponding Japanese Patent Application No. 2007-510649.

*Primary Examiner*—Paul R Durand
(74) *Attorney, Agent, or Firm*—Buchanan Ingersoll & Rooney PC

(57) ABSTRACT

The invention relates to a counter element (22) being adapted to apply a pressure to a first portion of a packaging material in association with heating of the packaging material in order to seal the first portion of the packaging material to a second portion of the packaging material. The element (22) being provided with an abutment surface (23) adapted to at least abut said first portion of the packaging material. The abutment surface (23) is provided with a plurality of indentations (24) adapted to entrap fluid or gas present in the vicinity of the abutment surface (23) and the first portion of the packaging material. The inventions also relates to a method of providing a counter element (22) as described above.

26 Claims, 6 Drawing Sheets

U.S. PATENT DOCUMENTS

| | | | |
|---|---|---|---|
| 4,455,808 A * | 6/1984 | Netzhammer | 53/371.2 |
| 4,546,596 A * | 10/1985 | Cherney | 53/451 |
| 4,582,555 A * | 4/1986 | Bower | 156/290 |
| 4,586,317 A * | 5/1986 | Bussell | 53/451 |
| 4,630,429 A * | 12/1986 | Christine | 53/479 |
| 4,768,326 A * | 9/1988 | Kovacs | 53/374.8 |
| 5,015,223 A * | 5/1991 | Boeckmann | 493/194 |
| 5,076,040 A * | 12/1991 | Davis | 53/551 |
| 5,247,779 A * | 9/1993 | Wirsig et al. | 53/374.2 |
| 5,326,416 A * | 7/1994 | Perrett | 156/251 |
| 5,419,801 A * | 5/1995 | McDonald | 156/581 |
| 5,571,370 A * | 11/1996 | Selberg et al. | 156/498 |
| 5,714,033 A * | 2/1998 | Hayashi et al. | 156/380.5 |
| 5,787,690 A * | 8/1998 | Konno | 53/550 |
| 5,868,901 A * | 2/1999 | Smith | 156/582 |
| 5,870,887 A * | 2/1999 | Bennett | 53/551 |
| 6,041,580 A * | 3/2000 | Wojtech | 53/551 |
| 6,167,681 B1 | 1/2001 | Yano et al. | |
| 6,216,420 B1 * | 4/2001 | Mazzetto et al. | 53/373.7 |
| 6,237,308 B1 * | 5/2001 | Quintin et al. | 53/451 |
| 6,301,859 B1 * | 10/2001 | Nakamura et al. | 53/373.7 |
| 6,725,634 B1 * | 4/2004 | Palmqvist et al. | 53/548 |
| 6,986,232 B1 * | 1/2006 | Kume et al. | 53/371.2 |
| 7,003,934 B1 * | 2/2006 | Yano | 53/552 |
| 7,059,100 B2 * | 6/2006 | Babini et al. | 53/376.2 |
| 7,104,028 B2 * | 9/2006 | Paradisi et al. | 53/374.5 |
| 7,219,483 B2 * | 5/2007 | Adair et al. | 53/451 |

FOREIGN PATENT DOCUMENTS

| | | |
|---|---|---|
| EP | 1241098 B1 | 9/2002 |
| EP | 1 300 340 A1 | 4/2003 |
| JP | 5-58265 | 8/1993 |
| JP | 8-244728 A | 9/1996 |
| JP | 2000-177715 A | 6/2000 |
| JP | 2002-326294 A | 11/2002 |
| WO | WO 97/28045 A1 | 8/1997 |

* cited by examiner

COUNTER ELEMENT AND METHOD OF PRODUCING THE SAME

FIELD OF INVENTION

The present invention relates to a counter element being adapted to apply a pressure to a first portion of a packaging material in association with heating of the packaging material in order to seal the first portion of the packaging material to a second portion of the packaging material, the element being provided with a abutment surface adapted to at least abut said first portion of the packaging material.

TECHNICAL BACKGROUND

Food packaging processes of today (with the term "food" is meant all sorts of solid and liquid food, such as juices, milk and other beverages as well as pastes, soups, jellies and cheese) often are of the type "form-fill-seal" and may be carried out by shaping a continuously moving web-shaped packaging material made of a flexible laminate into a continuously running tube, continuously filling the tube with the desired food product to be packaged and by sealing and finally cutting off sealed packages from the tube. An example of such forming of a tube from a continuous web of packaging material and the further formation of packaging containers is schematically shown in FIG. 1a.

The packaging processes are often high speed continuous processes, wherein the packaging material in the form of a web 10 is continuously fed through a machine, sterilised, for example by passing through a liquid or gas-phase quick acting sterilising medium, formed and sealed into the required tube-shape 11 for being filled with the food to be packaged and finally transversally sealed.

The continuous web-shaped packaging material is manufactured with a packaging material manufacturing machine and placed on a reel 1. The packaging material often has a laminated structure comprising a core layer of paper or paperboard, an outer heat-sealing layer of a thermoplastic polymer (such as for example polyethylene) on each side of the core layer and, if necessary, an aluminium foil gas-barrier layer interposed between the paper core layer and the film. Alternatively, a gas-barrier layer of a plastics or inorganic material, such as for example polyamide, polyethylene vinyl alcohol (EVOH) or silicon oxide, may be employed instead of aluminium foil.

The reel 1 with packaging material is installed in the packaging machine where it is reeled out and routed within the packaging machine using drive mechanisms disposed in several positions in the machine. The packaging material web is shaped into a tube and sealed in the longitudinal direction within the packaging machine. While the tube is being transferred downward within the packaging machine, the liquid or flowing food product is supplied from above to fill the inside of the tubular packaging material. Next, the packaging material tube is squeezed laterally from both sides and sealed in the lateral direction at specified intervals to form interconnected, filled and sealed packaging containers 11'. Next, the sealed packaging containers are separated off from the tube by cutting between the laterally extending sealed portions, and the thus separated packaging containers are brought into a specified, desired shape, for example by folding and bending along previously formed crease lines in the packaging material, and, if required, finally sealed in order to remain in that shape.

The sealing of the tubular packaging material in the longitudinal or lateral direction is carried out by heat sealing of the outer surfaces of the packaging material, which are made of heat sealing thermoplastics, to each other. This may be performed by known heat sealing techniques, such as for example induction heat sealing, radio frequency (RF) or microwave heat sealing, heat convection sealing or ultrasonic vibration heat sealing. A very common heat sealing technique today for the transversal heat seals in the case of aseptic packaging, is the induction heat sealing, wherein the aluminium foil in the packaging laminate co-acts with an inductor in order to generate heat. The thermoplastic surfaces are bonded to each other by heat fusion by simultaneous application of the induction current and pressure.

Pre-cut blanks of packaging material may be fed into a packaging machine, folded and longitudinally sealed, foldformed and sealed at the bottom in order to provide open package capsules. The capsules are filled and subsequently sealed at the top, thus providing filled packages (11").

Conventional packaging machines thus employ a heatsealing apparatus to seal the packaging material. The sealing apparatus is normally provided with so-called counter jaws and heat seal jaws disposed and working in opposing relation to each other.

An example of such a heat sealing apparatus is schematically shown in FIG. 4, while a cross-section view of a typical counter jaw 20 and a heat-seal jaw 30 is schematically shown in FIG. 5.

Conventionally, for transversal heat sealing, each counter jaw is provided with a pair of counter rails 21, while each heat-seal jaw is provided with a sealing block 31. Each counter rail 21 and oppositely facing seal block 31 are capable of creating one transversal heat seal S across the packaging material. A cutter 40 may be disposed in the gap formed between the two counter rails 21. Each counter rail 21 is provided with a counter element 22, a so-called "dolly" or "pressure pad", that extends along the counter rail, while the sealing block 31, in the case of induction sealing, is provided with an inductor coil 33 disposed opposite to the dolly 22. Most commonly, in the case of packaging into a continuous tubular packaging material, the sealing and cutting operations are performed in the same part of the packaging process.

However, it is also fully possible to separate the sealing and the cutting operations from each other, for example by subsequently cutting the filled and sealed tube in a separate cutting unit.

FIGS. 2 and 3, schematically illustrate a side-view of a conventional counter rail and sealing block for induction sealing, disposed on opposite sides of the packaging material to be heat sealed, before and after the sealing S has been carried out.

As shown in FIGS. 2 and 3, the packaging material walls 12, 13 of a tube or capsule may be placed in face-to-face relation to each other in a sealing zone S, for transversal induction sealing of the for example tubular packaging material 11. Each of the packaging material walls 12, 13 is normally of a laminate structure made up of a paper base layer 14, and a film layer 16 of polyethylene, for example, located on the inside surface of the aluminium foil layer 15. Although not specifically illustrated, the outside surface of the paper base layer 14 is also coated with a layer of plastics material such as polyethylene. The polyethylene portions 16 of the two packaging materials 12, 13 are bonded together by heat fusion.

In other heat-sealing methods, such as in high frequency (RF) sealing or heat convection sealing, an aluminium foil layer is not needed for the generation of heat.

The counter rail 21 normally is made of steel, and fulfils the requirements on planarity and parallelism. Depending on i.a. the requirements of the seal quality, the type of packaging material, the size of the package and the type of product to be packed, the shape and mechanical properties of the dolly 22 may be varied to suit the circumstances best. In the case of high quality seals as in the case of the present invention, such as for example for aseptic or long-term storage, so-called "extended shelf-life" packaging, the dolly needs to have some degree of flexibility and compressibility for control of the flow of the heated thermoplastics from the layer 16 in the seal zone S.

The inductor coil 33 extends along the sealing block 31 and is normally provided with a projection 35 extending toward the counter jaws. A coolant passage 36 is formed through the inductor coil 33 to control the temperature of the inductor coil 33 as a result of coolant flowing through the coolant passage 36. In the initial stages of the sealing process shown in FIG. 2, the packaging material 11 is placed between the sealing block 31 and the counter rail 21 with dolly 22, whereupon the counter jaw and the heat seal jaw are moved so that they approach each other. Subsequently, the counter jaw and the heat seal jaw are moved further towards each other, and the sealing portion of the packaging material 11 is pressed hard and deformed with the inductor coil 33 and the counter element 22. A high frequency voltage is applied with a power device (not shown) to cause the aluminium foil 15 to generate heat with induction current. As a result, as shown in FIG. 3, the paired polyethylene portions 16 of the packaging material facing each other and squeezed between the paired aluminium foils 15 are heated and the polyethylene portions 16 in the sealing zone S are fused.

Consequently, the tubular packaging material 11 is bonded together by heat fusion.

As shown in FIG. 3, the compressible counter element 22 is deformed during the sealing stage. When the pressure from the sealing block and the counter rail is released, the counter element is resuming its original shape and is ready for the next sealing and compression operation. Such compressible counter elements are conventionally made of a plastics material with suitable mechanical and chemical properties. Today, most commonly a cross-linked polyurethane (PUR) is used for this purpose. The desired shape and configuration of the dolly is usually cut out from a cross-linked polyurethane material. The dolly of cross-linked PUR is fastened into the cutting rail of stainless, chemically resistant steel by insertion into a groove 27 extending along the counter rail 21. The configuration, hardness and compressibility of the dolly are factors of great importance to the quality of the seal, and may vary depending on the various factors listed above, i.e. required seal quality, type of packaging material, package size and product to be filled. Different shapes and hardness/compressibility properties of the dolly will influence the flow of thermoplastics in the seal zone S during heat fusion differently. Furthermore, these are important factors influencing the way in which the filled product in the tube is squeezed away from the sealing zone S. Different shapes have thus proved to be optimal for different combinations of package sizes and products to be filled.

Furthermore, the plastics material used in the dolly should be resistant to chemicals (for example alkaline cleaning agents, lactic acid and other substances in various filling products and to sterilisation agents, such as for example hydrogen peroxide ($H_2O_2$).

Although the known counter rail and dolly functions quite adequately, it does have a number of disadvantages. The main drawback with this known construction is that the dolly is made of a rather soft material in relation to the cutting rail and the sealing block, and will wear out after some time and thus must be exchanged for a new one with regular intervals. Each time the dolly is changed the packaging machine has to be stopped entirely. First, the counter rail has to be removed from the counter jaw, to which it is attached during operation. Then, the old dolly, which is fastened into the groove in the counter rail, has to be removed.

When the old dolly has been removed, a new fresh dolly must be inserted into the narrow groove of the counter rail and subsequently the counter rail has to be attached to the counter jaw and the machine started up again. The groove, as well as the dolly, usually has an asymmetrical cross-section configuration and it is important that the dolly is carefully fastened and secured into the groove and that it is inserted in the right position, i.e. oriented in the right way. The steps of changing the dolly take some time, since the dolly should be quite strongly fastened into the groove and the dolly, therefore, has a slightly larger cross-section than the groove. Accordingly, the dolly must be pulled out of, respectively pressed into, the groove by using some force. This is done manually, since it is a quite complicated operation. The time the machine has to be completely stopped may amount to up to about 10 minutes, including the slow-down and start-up time during which the machine is adjusted from/to normal operation speed, during which time at least 600-1300 packages could have been produced at normal production speed, depending on the type of packaging machine.

A device for heat-sealing a tube of sheet packaging material filled with a pourable food product is described in EP 1 300 340 A1. The device has a first and a second jaw having sealing means and pressure means, respectively. The jaws are movable towards each other in a direction transverse to the feed path of the tube in order to grip the tube at a certain portion of the tube and to seal the tube at said portion. The first jaw (usually named sealing jaw) defines a first contact surface cooperating with the tube of packaging material and has at least one projection; and the second jaw (usually named counter jaw) defines a second contact surface, which is convex at least at the projection of the first contact surface.

A similar device for heat sealing is disclosed in U.S. Pat. No. 6,216,420 B1. The device for heat sealing a tube of packaging sheet material has first and second jaws movable towards each other to grip the tube under pressure and heat seal the tube. The first jaw has a heating element having a pair of substantially straight active surfaces, which extend on opposite sides of and parallel to an intermediate plane. The second jaw has a pair of pressure pads, which are housed in respective seats and cooperate with the active surfaces of the heating element.

WO 00/44625 relates to a counter rail and dolly, suitable for use in an apparatus for heat sealing a laminated packaging material for packaging of a liquid or a flowing product, wherein the counter rail and the dolly each are made of a substantially plastics material. The document also relates to an apparatus for heat sealing and to a sealing/cutting apparatus including said counter rail and dolly. Furthermore, the document discloses a method of producing said counter rail and dolly by means of co-injection moulding.

When designing the above-described heat-sealing apparatuses a critical factor is the lifetime of the rubber part forming the contact surface of the counter jaw. This part of the heat sealing apparatus is in commercial applications of today often replaced at intervals of less than about 40 hours of production due to the occurrence of unwanted marks or cuts on the abutment surface.

Moreover, a problem often arising is that the rubber dolly has a tendency to stick to the packaging material which might cause forming problems and damages to the packaging material and the to the rubber dolly. Another problem with the sealing system according to the conventional technology is that the sealing window, i.e. the interval in between the essential sealing parameters can be chosen, is to narrow to give the machine operators a satisfactory safety margin between optimal seals and non satisfactory seals.

SUMMARY OF INVENTION

The above mentioned problems have been eliminated or at least reduced by the introduction of a sealing jaw with a counter element which has been given the characterising features that the abutment surface is provided with a plurality of indentations adapted to entrap fluid or gas present in the vicinity of the abutment surface and the first portion of the packaging material. By forming indentations on the abutment surface it has been found that fluid or gas can be forced to be entrapped and brought to the contact area between the abutment surface and said first portion of the packaging material. The fluid or gas introduced between the abutment surface and said first portion of the packaging material will act as lubrication which will smoothen the pressure distribution in the contact area, which in turn will lower the wear on the abutment surface and the packaging material. It has been found that the lifetime has been significantly improved by the introduction of the indentations as described above. In tests under commercial production circumstances it has been found that the lifetime is about two to five times the lifetime of the conventional systems described in the introductory part of the description. In conventional systems it is common to flush the sealing area with water in order to cool the tube. It has been found that the fluid entrapped in the indentations has a pressure distributing effect making it possible to form high quality seals also at the crossing of the longitudinal seal and the transversal seal within a wider sealing window. It has also been found that the water entrapped will transport heat from the jaws and the packaging material much more effective than just flushing the tube.

Preferred embodiments of the invention are defined in the dependent claims.

According to a preferred embodiment the indentations have a depth of about 25-500 µm, preferably about 100-250 µm, and most preferably about 170 µm. It has been found that the above depth values are suitable to use since e.g. water will be retained during the sealing time interval but will disappear during the subsequent cooling time interval.

According to an alternative preferred embodiment the abutment surface is provided with a plurality of indentations having a first depth and a plurality of indentations having a second depth being different from the first depth.

With this kind of configuration will e.g. be possible to optimise the functionality for a number of different working conditions. It will e.g. be possible to form the abutment surface with indentations adapted for a first fluid (air) for certain applications and with indentations adapted for a second fluid (water) for other applications without the need of changing the abutment surface.

Preferably the indentations each are substantially shaped as a part of a sphere. This design is preferred since it is easy to produce and define in the production of the abutment surface. Moreover, the shape is presently preferred considering the entrapment of the fluid or gas since it is considered to be in line with the preferred shape of a free droplet of the fluid. Moreover, it is also considered to give a suitable pressure distribution from the fluid into the abutment surface without any undesired pressure peaks.

In accordance with a preferred embodiment the indentations have sphere radii of about 0.15-0.80 mm, preferably about 0.25-0.50 mm. It has been found that the above radii values are suitable to use since e.g. water will be retained during the sealing time interval but will disappear during the subsequent cooling time interval.

Preferably the indentations have a sphere radius to depth ratio in the order of 10-50 to 1, and preferably in the order of 20-30 to 1. It has been found that the above ratio values are suitable to use since e.g. water will be retained during the sealing time interval but will disappear during the subsequent cooling time interval. The water will be heated during the sealing and will at its removal remove heat from the sealing jaw system, thus enhancing the cooling of the system between the sealing operations.

According to a preferred embodiment the abutment surface is provided with indentations at about 15-50% of its total area and preferably at about 20-40%. The total area of the indentations is calculated considering the desired pressure distribution per square mm, the desired lubrication effect and the desired heat dissipation effect.

Preferably the abutment surface is provided with indentations along a first set of mutually essentially parallel geometrical lines and a second set of mutually essentially parallel geometrical lines, the second set of lines being oriented essentially transverse to the first set of lines. This will help achieving good sealing performances and still achieve the above objects with lubrication etc. It is, moreover, a simple design when it comes to manufacturing of the moulds or the counter elements.

BRIEF DESCRIPTION OF DRAWINGS

The invention will be described in more detail with reference to the appended schematic drawings, which shows an example of a presently preferred embodiment of the invention.

DETAILED DESCRIPTION OF PREFERRED EMBODIMENTS

The heat-sealing technology as such is thoroughly described in the above-mentioned documents EP 1 300 340 A1, U.S. Pat. No. 6,216,420 B1 and WO 00744625 all filed by the same applicant, as is the case of the present application. For a description about the heat sealing technology as such reference is made to those documents. Moreover, a rather detailed description of the sealing technology as such has been made in the description of the background technology. In this description of preferred embodiments only features necessary for the comprehension of the invention will be described.

Figure 1:
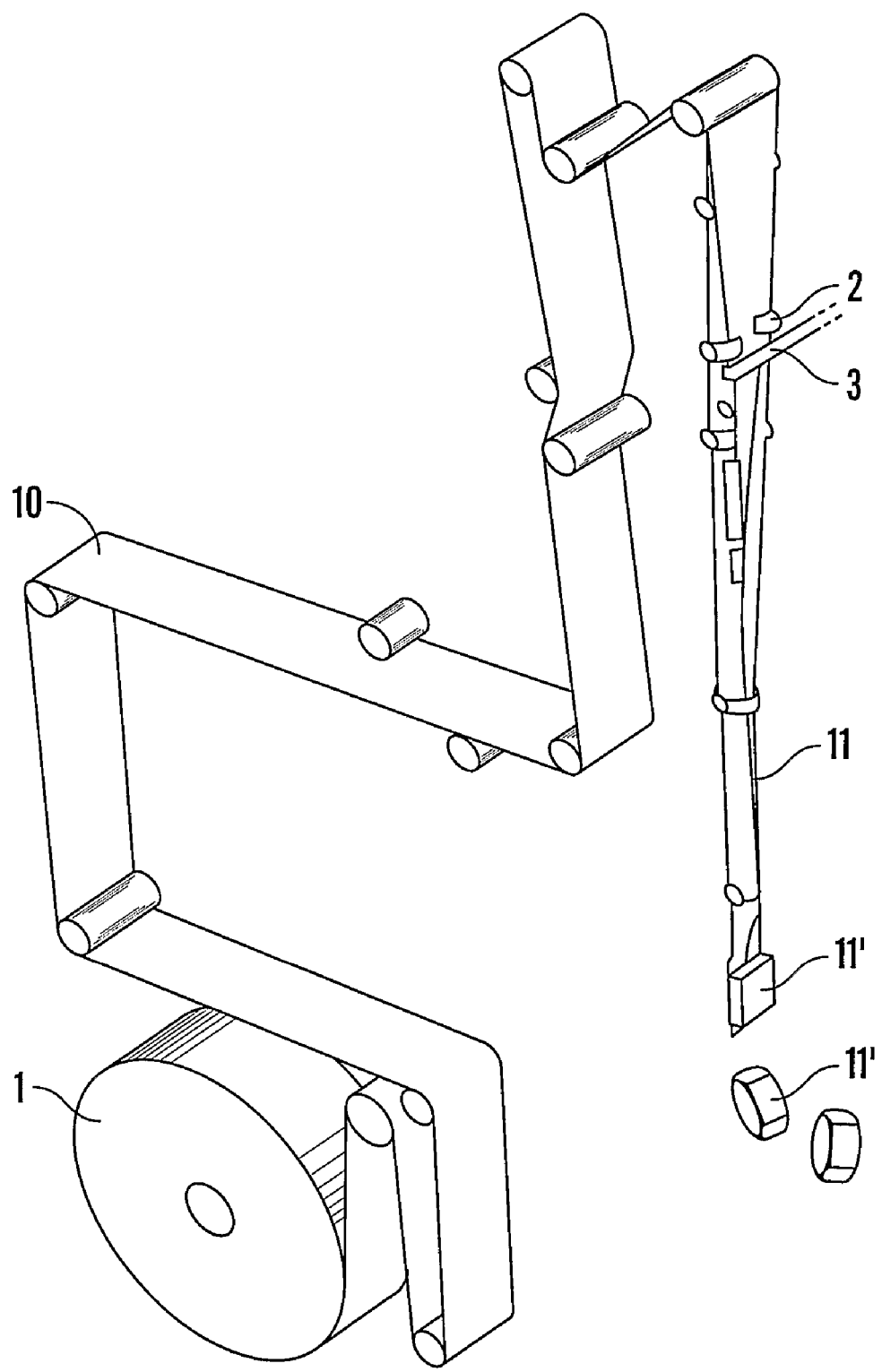
FIG. 1 schematically illustrates a machine for making packaging containers.
Figure 2:
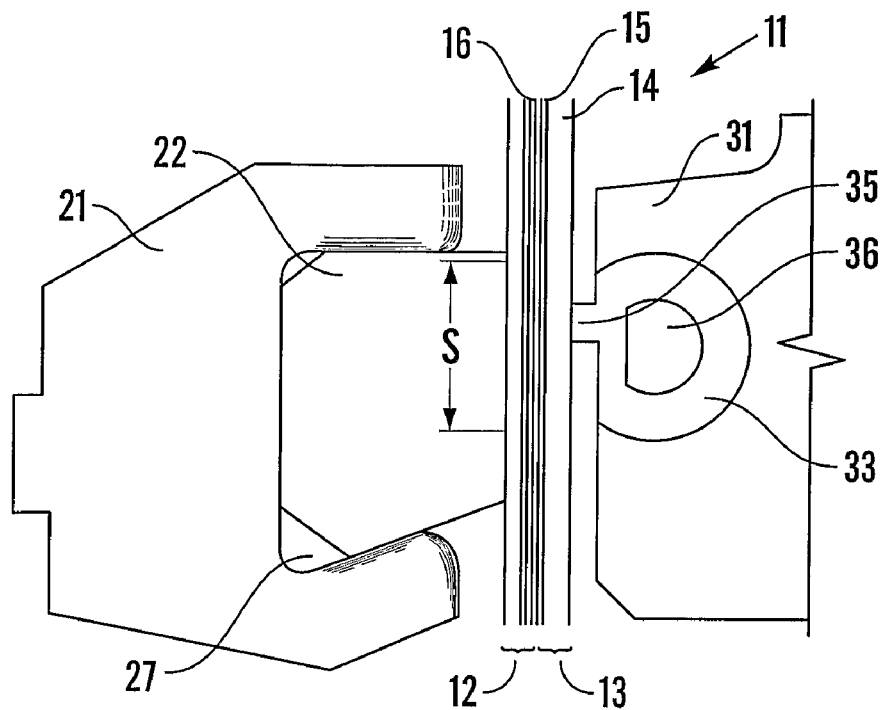
FIG. 2 schematically illustrates a cross-sectional side view of a part of a conventional sealing apparatus, i.e. a counter rail provided with a dolly facing a sealing block on the opposite side of the packaging material, in an initial stage of the operation of creating a transversal seal.
Figure 3:
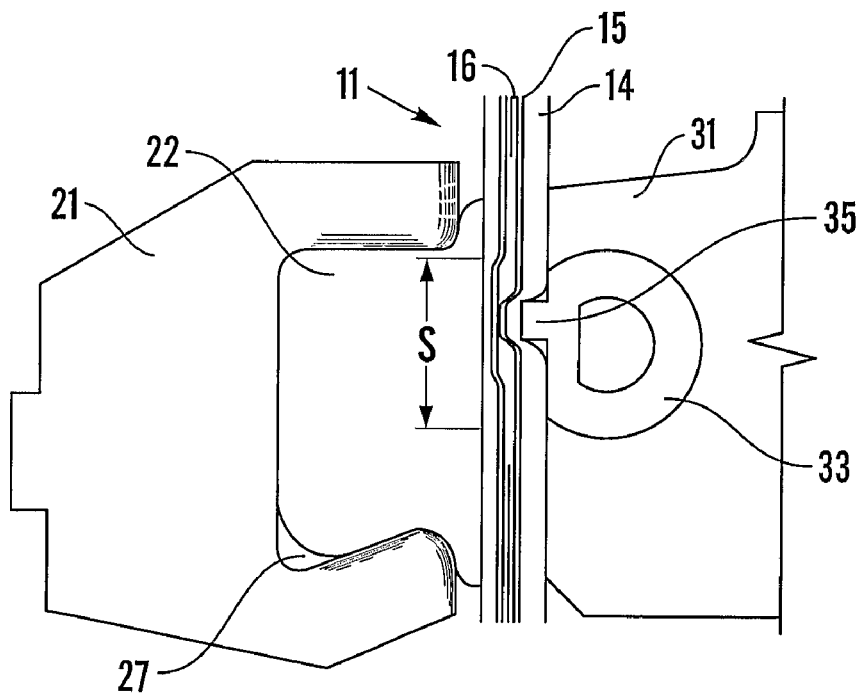
FIG. 3 schematically shows the same conventional counter rail and dolly arrangement as in FIG. 2, in a final stage of the sealing operation.
Figure 4:
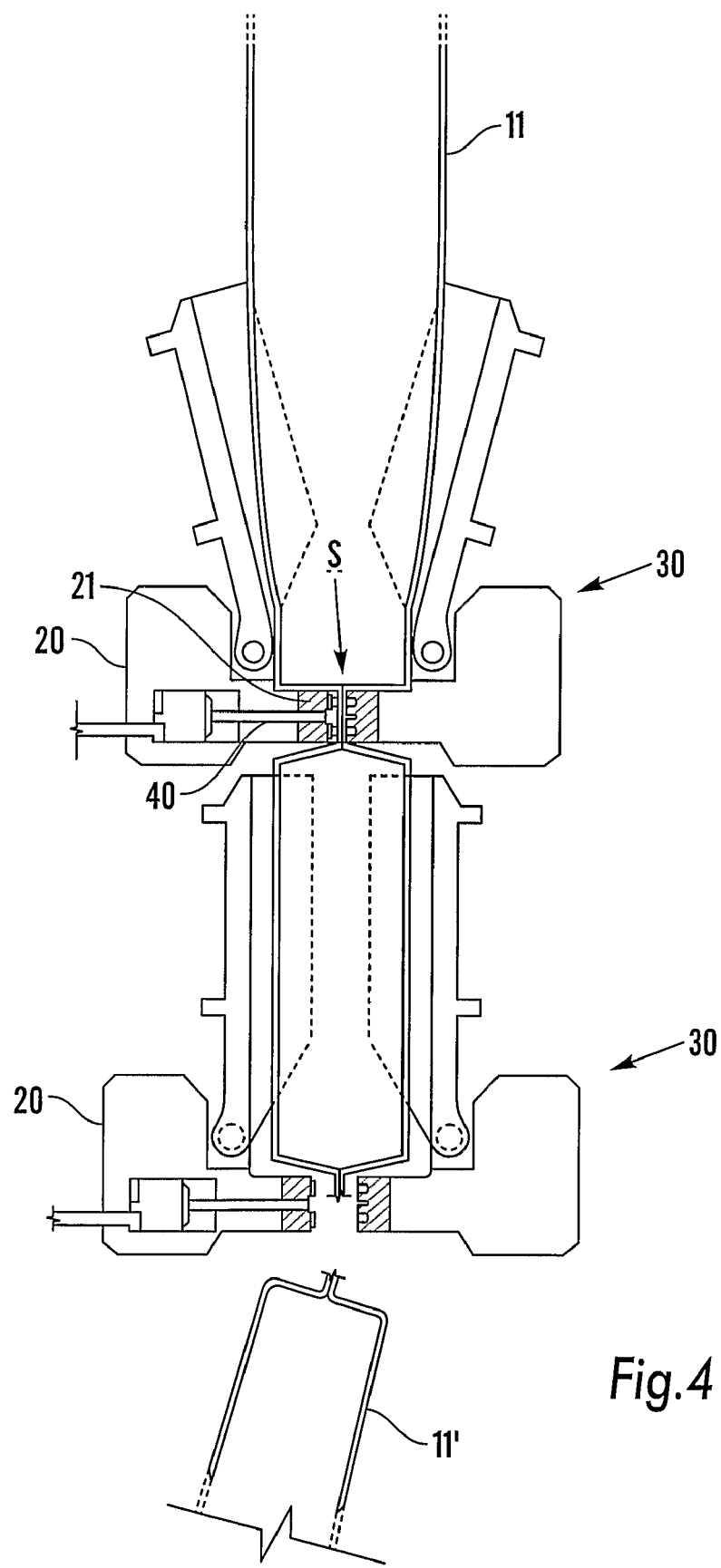
FIG. 4 schematically illustrates a side view, partially in section, of an example of a sealing and cutting apparatus of the present invention during use.
Figure 6:
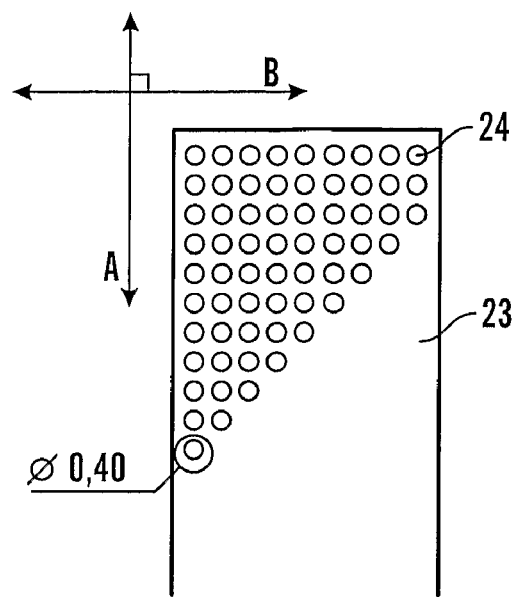
FIG. 6 is a plan view of the abutment surface of the pressure pad of the jaw according to the invention showing the distribution of the indentations (for reason of clarity and simplifying the picture only indentations are indicated in the upper left corner.
Figure 7:
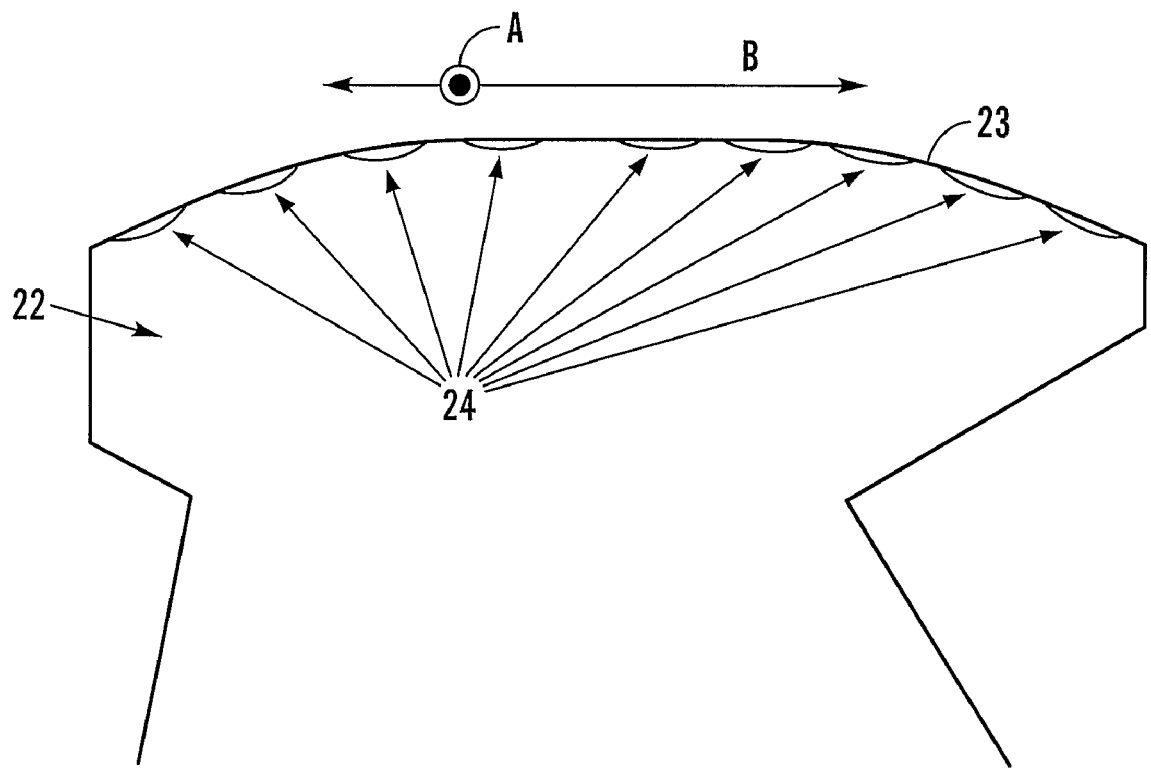
FIG. 7 is a cross-section of the pressure pad showing the mushroom shape of the pressure pad and the shape of the indentation.
Figure 8:
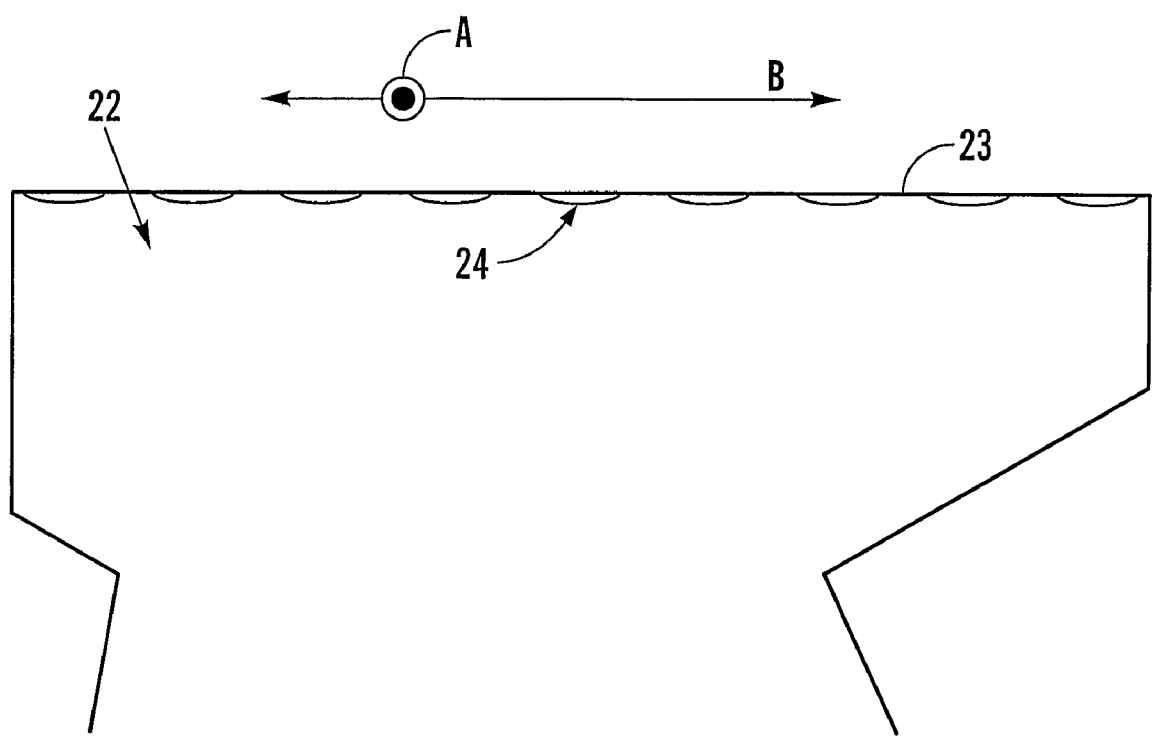
FIG. 8 is a is a cross-section of the pressure pad showing a flat abutment surface of the pressure pad and the shape of the indentation, whereas the scale of FIGS. 7 and 8 is about five times the scale of FIG. 6.

As is apparent from FIG. 6-8, the dolly 22 is provided with an abutment surface 23 adapted to apply a pressure to a first portion S of a packaging material to be sealed to a second portion of a packaging material. As is apparent from FIG. 7-8, the dollys are formed with a cross-section essentially formed as mushrooms, i.e. they have a shape essentially corresponding to the shape shown in FIG. 3 already in the unloaded state. In FIG. 7 the abutment surface 23 is formed as a convex surface whereas in FIG. 8 the abutment surface 23 is formed as a flat surface.

Figure 5:
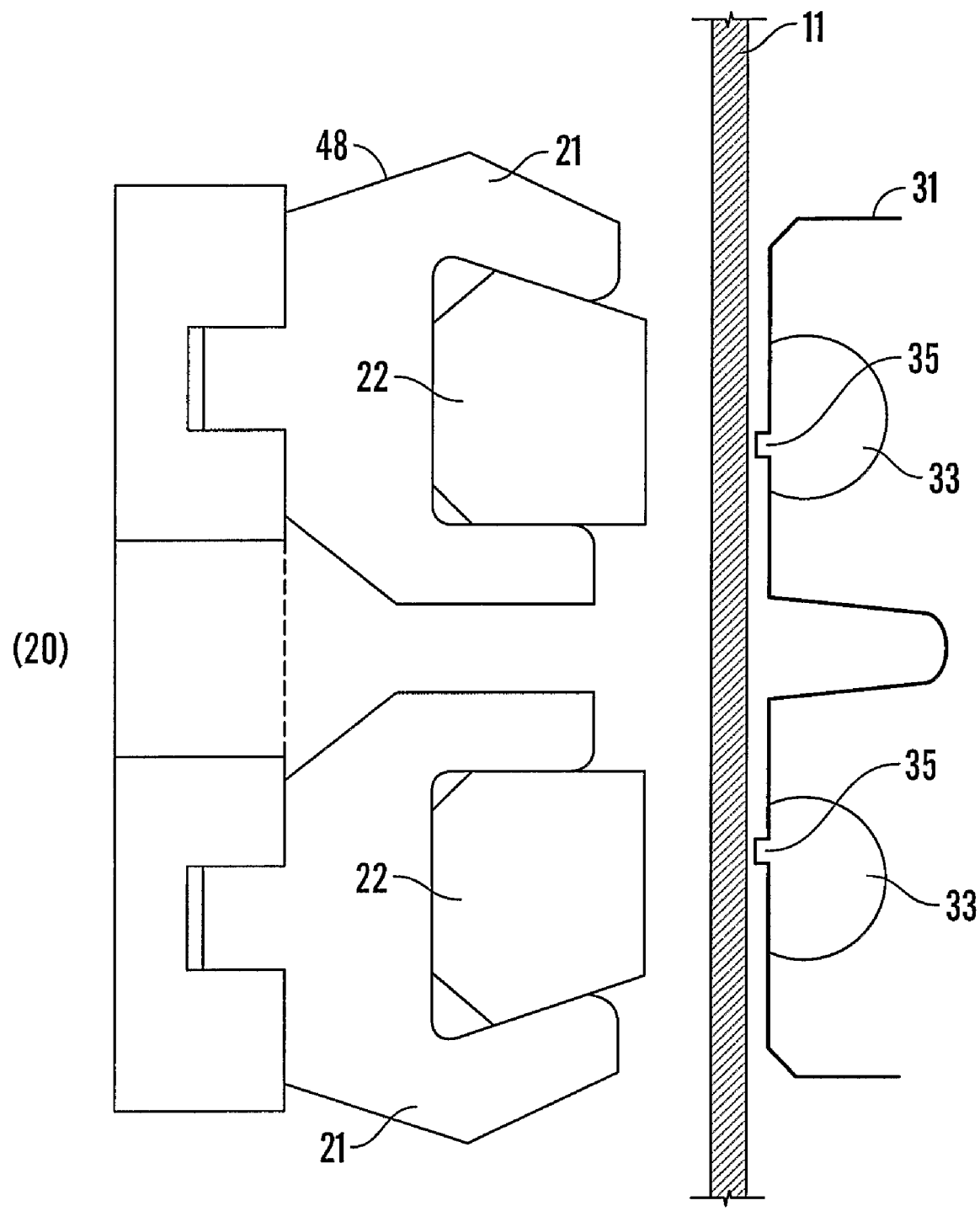
FIG. 5 shows a cross-sectional side view of an example of a counter jaw to which a pair of counter rails are attached as well as a sealing block provided with inductor coils.

The abutment surface 23 is provided with a plurality of discrete indentations 24, which as mentioned above are adapted to entrap any fluid or gas present. As shown in FIG. 6-8, the indentations 24 are shaped as a part of a sphere. The radius R of the indentations 24 is about 0.40 mm. The indentations have a depth A of about 0.017 mm. This ratio between the radius and the depth results in the centre of the geometrical sphere being located about 0.183 mm above the plane of the abutment surface. As is shown in FIG. 6 the indentations 24 are arranged symmetrically along a number of lines along A and across B the transversal seal. The longitudinal direction A extends into and out of the drawing paper in FIG. 5 and the transversal direction B extends upwards and downwards parallel to the plane of the drawing paper of FIG. 5. In a final package the longitudinal direction A will extend along the sealing fin along the width of the package on the top or the bottom of the package, whereas the transversal direction B will extend a few millimetres upwardly along the height of the sealing fin.

As shown in FIG. 6-8 the indentations 24 are distributed over the entire abutment surface 23. As mentioned before the indentations 24 are only shown in the upper left corner of FIG. 6.

When the sealing jaw 30 and the counter jaw 20 are forced towards each other they will clamp the packaging material 11 between them. During the simultaneous movement downwards they will pull the tube downwards and thus contribute to the transport of the web 11 through the machine. As described above the sealing jaw 30 will during the movement downwards supply a magnetic field, which will induce currents in the aluminium foil layer 15 which will heat the aluminium foil layer 15 and the adjacent plastic layer 16. The heating and pressure will make the plastic layers 16 to fuse together and after cooling they will thereby form a seal S. In order to enhance the cooling of the packaging material formed into a line of interconnected packages or a line of separate packages and the sealing system the tube is flushed with cooling water. As mentioned above the abutment surface 23 is provided with a plurality of indentations 24 which are adapted to entrap this tube flushing water being present in the vicinity of the abutment surface 23 and the of the packaging material that is being sealed.

The water will act as lubrication and will thereby significantly reduce the risk of the packaging material and the rubber dolly to stick to each other. If they stick together it might result in damaged dollies or damaged packages. It might also cause forming problems if the packaging material is not drawn downwardly exactly as anticipated since the forming elements might then interact with the packaging material in a manner not anticipated. The water entrapped will also, since it is in direct contact with the material by the sealing area retract a significant amount of heat, which will make sure that the seal is duly cooled when the clamping force from the sealing jaw 30 and the counter jaw 20 is released. The shape of the indentations 24 is chosen to ensure that the entrapped water will be released before the next sealing cycle for the sealing jaw in question is started. This ensures that the heated water will not remain in the indentations but instead will be replaced with new cool water.

The counter element 22 and thus also the abutment surface 23 is formed of an elastic polymer material, preferably an elastomer, This way the abutment surface will be flexible and make a favourable pressure distribution onto the packaging material to be sealed. In accordance with a first embodiment the counter element 22 and its abutment surface 23 is formed of a cured polymer material, preferably a polyurethane rubber. In accordance with a second embodiment the counter element 22 and its abutment surface 23 is formed of an injection mouldable polymer material, preferably a thermoplastic polyurethane elastomer.

With the considerations concerning lubrication and cooling effect it is considered that a number of parameters can be chosen within a set of ranges. The indentations 24 have a depth of about 25-500 μm, preferably about 100-250 μm. The abutment surface 23 is provided with a plurality of indentations 24 having a first depth and a plurality of indentations having a second depth being different from the first depth. The indentations 24 have sphere radii of about 0.15-0.80 mm, preferably about 0.25-0.50 mm. The indentations 24 have a sphere radius to depth ratio in the order of 10-50 to 1, and preferably in the order of 20-30 to 1. In order to provide a satisfactory pressure distribution, lubrication and cooling effect the abutment surface 23 is provided with indentations 24 at about 15-50% of its total area and preferably at about 20-40%. The area considered is the area being in contact with the packaging material and being adapted to apply a pressure onto the packaging material.

The counter element 22 as described above (according to the embodiment formed of injection mouldable plastic) is preferably manufactured according to the method as described hereinafter.

The method involves the steps of providing a mould having a cavity with a shape corresponding to at least one counter element and injecting an injection mouldable polymer material into the cavity. The cavity is formed with a plurality of protuberances adapted to form said indentations 24 in the abutment surface 23 of the counter element 22. This method makes it easy to form the desired indentations 24 in the abutment surface 23 in a very controlled manner. The manner of providing the cavity and the manner of heating the plastic to mouldable temperature and the manner of injecting the plastic using some kind of injection unit, pressure cylinder or the like, is not described since it is will known in the art of producing plastic or elastomeric articles.

It is contemplated that there are numerous modifications of the embodiments described herein, which are still within the scope of the invention as defined by the appended claims.

For instance it is contemplated that the indentations may be arranged in a manner different from being provided side by side along two perpendicular sets of parallel lines. The indentations may e.g. be formed in a staggered manner where the indentations on every second line is displaced to the place in between the indentations of the line of each side of said line (like the centre dot on a dice on the side showing number five).

The invention claimed is:

1. A packaging machine which forms a web-shaped packaging material into a tubular shape, introduces food product into the tubular-shaped packaging material, and seals the tubular-shaped packaging material at spaced apart intervals to form interconnected filled and sealed packaging containers which are separated from one another, the packaging machine comprising:
a heat seal jaw;
a counter element positioned in opposition to the heat seal jaw to apply pressure to a first portion of the packaging material positioned between the heat seal jaw and the counter element in association with heating of the packaging material by the heat seal jaw to seal the first portion of the packaging material to a second portion of the packaging material,
the counter element comprising an abutment surface adapted to abut at least the first portion of the packaging material, the abutment surface possessing an outer circumference, and
the abutment surface comprising a plurality of indentations adapted to entrap fluid or gas present in a vicinity of the abutment surface and the first portion of the packaging material, the plurality of indentations being individually discrete indentations positioned in spaced apart relation to one another, at least some of the plurality of indentations possessing an outer periphery that does not intersect the outer circumference of the abutment surface.

2. A packaging machine according to claim 1, wherein the heat seal jaw comprises an inductor coil extending along a sealing block.

3. A packaging machine according to claim 1, wherein the abutment surface is formed of an elastic polymer material.

4. A packaging machine according to claim 1, wherein the indentations each are substantially shaped as a part of a sphere.

5. A packaging machine according to claim 1, wherein the plurality of indentations comprises a first indentation and three second indentations, the three second indentations surrounding the first indentation, with none of the plurality of indentations being positioned between the first indentation and the second indentations.

6. Counter element being adapted to apply a pressure to a first portion of a packaging material in association with heating of the packaging material by a heat seal element positioned in opposition to the counter element in order to seal the first portion of the packaging material to a second portion of the packaging material, the counter element being provided with an abutment surface adapted to at least abut said first portion of the packaging material the abutment surface being formed of an elastic polymer material and provided with a plurality of indentations adapted to entrap fluid or gas present in a vicinity of the abutment surface and the first portion of the packaging material, the plurality of indentations being individually discrete indentations positioned in spaced apart relation to one another, the plurality of indentations each possessing a continuous outer periphery at the abutment surface.

7. Counter element according to claim 6, wherein the abutment surface is formed of a cured polymer material.

8. Counter element according to claim 6, wherein the abutment surface is formed of an injection mouldable polymer material.

9. Counter element according to claim 6, wherein the indentations have a depth of about 25-500 μm.

10. Counter element according to claim 6, wherein the abutment surface is provided with a plurality of indentations having a first depth and a plurality of indentations having a second depth being different from the first depth.

11. Counter element according to claim 6, wherein the indentations each are substantially shaped as a part of a sphere.

12. Counter element according to claim 11, wherein the indentations have sphere radii of about 0.25-0.50 mm.

13. Counter element according to claim 11, wherein the indentations have sphere radii of about 0.15-0.80 mm.

14. Counter element according to claim 13, wherein the indentations have a sphere radius to depth ratio in the order of 10-50 to 1.

15. Counter element according to claim 13, wherein the indentations have a sphere radius to depth ratio in the order of 20-30 to 1.

16. Counter element according to claim 6, wherein the abutment surface is provided with indentations at about 15-50% of its total area.

17. Counter element according to claim 6, wherein the abutment surface is provided with indentations along a first set of mutually essentially parallel geometrical lines and a second set of mutually essentially parallel geometrical lines, the second set of lines being oriented essentially transverse to the first set of lines.

18. Counter element according to claim 6, wherein the abutment surface is formed of an elastomer.

19. Counter element according to claim 6, wherein the abutment surface is formed of a polyurethane rubber.

20. Counter element according to claim 6, wherein the abutment surface is formed of a thermoplastic polyurethane elastomer.

21. Counter element according to claim 6, wherein the indentations have a depth of about 100-250 μm.

22. Counter element according to claim 6, wherein the abutment surface is provided with indentations at about 20-40% of its total area.

23. The counter element according to claim 6, wherein the abutment surface of the counter element possesses a longitudinal direction and a transverse direction, and the plurality of indentations includes a plurality of discrete indentations spaced from one another in the longitudinal direction and transverse direction of the abutment surface.

24. The counter element according to claim 6, wherein the plurality of indentations comprises a first indentation and three second indentations, the three second indentations surrounding the first indentation, with none of the plurality of indentations being positioned between the first indentation and the second indentations.

25. A Counter element being adapted to apply a pressure to a first portion of a packaging material in association with heating of the packaging material in order to seal the first portion of the packaging material to a second portion of the packaging material, the counter element being provided with an abutment surface adapted to at least abut said first portion of the packaging material the abutment surface being provided with a plurality of indentations adapted to entrap fluid or gas present in a vicinity of the abutment surface and the first portion of the packaging material, wherein the indentations each are substantially shaped as a part of a sphere.

26. Method of producing a counter element according to claim 6, comprising:
   a) providing a mould having a cavity with a shape corresponding to at least one counter element, the cavity being fanned with a plurality of protuberances;
   b) injecting an injection mouldable polymer material into the cavity so that the material enters the plurality of protuberances to form indentations in a surface of the counter element, the indentations being adapted to entrap fluid or gas present in the vicinity of the surface and a first portion of a packaging material when the counter element is in use for heat sealing of the packaging material.

* * * * *